United States Patent
Benco et al.

(10) Patent No.: US 7,693,133 B2
(45) Date of Patent: Apr. 6, 2010

(54) SYSTEM AND METHOD FOR CONFERENCE CALLING WITH VOIP TERMINAL

(75) Inventors: David S. Benco, Winfield, IL (US);
Kevin J. Overend, Elmhurst, IL (US);
Baoling S. Sheen, Naperville, IL (US);
Sandra Lynn True, St. Charles, IL (US);
Kenneth J. Voight, Sugar Groove, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1498 days.

(21) Appl. No.: 11/026,815

(22) Filed: Dec. 30, 2004

(65) Prior Publication Data
US 2006/0146793 A1    Jul. 6, 2006

(51) Int. Cl.
*H04L 12/66*    (2006.01)

(52) U.S. Cl. ............ 370/352; 370/389; 370/395.52; 370/401; 379/202.01; 379/220.01; 455/466

(58) Field of Classification Search ........ 370/262, 370/263, 270, 267, 353, 355, 356, 352, 389, 370/395.52, 401; 379/202.01, 220.01; 455/466
See application file for complete search history.

(56) References Cited

U.S. PATENT DOCUMENTS

| | | | |
|---|---|---|---|
| 5,537,403 A * | 7/1996 | Cloonan et al. | 370/352 |
| 6,584,094 B2 * | 6/2003 | Maroulis et al. | 370/352 |
| 6,724,750 B1 * | 4/2004 | Sun | 370/352 |
| 6,920,213 B2 * | 7/2005 | Pershan | 379/212.01 |
| 6,940,960 B2 * | 9/2005 | Benco et al. | 379/202.01 |
| 7,006,496 B2 * | 2/2006 | Tadamura et al. | 370/389 |
| 7,046,683 B1 * | 5/2006 | Zhao | 370/401 |
| 7,085,364 B1 * | 8/2006 | Ahmed et al. | 379/202.01 |
| 7,099,322 B1 * | 8/2006 | Frouin et al. | 370/390 |
| 7,130,297 B1 * | 10/2006 | Sun | 370/352 |
| 7,418,090 B2 * | 8/2008 | Reding et al. | 379/202.01 |
| 7,436,785 B1 * | 10/2008 | McMullen et al. | 370/261 |
| 7,474,634 B1 * | 1/2009 | Webster et al. | 370/261 |
| 7,477,734 B1 * | 1/2009 | Smith | 379/220.01 |
| 7,483,400 B2 * | 1/2009 | Kuusinen et al. | 370/267 |
| 7,545,823 B1 * | 6/2009 | Zhao | 370/401 |
| 2003/0002476 A1 * | 1/2003 | Chung et al. | 370/352 |

(Continued)

OTHER PUBLICATIONS

*Chapter 4 Multi-Point Conference*, XP-002371227, pp. 145-166, Apr. 1, 2001.

(Continued)

Primary Examiner—Gerald Gauthier
(74) Attorney, Agent, or Firm—Fay Sharpe LLP

(57) ABSTRACT

A method and apparatus for connecting a plurality of called party terminals in a bridged a call session with a Voice Over Internet Protocol (VOIP) calling party terminal. The method includes the VOIP terminal sending called party terminal identifiers identifying each called party terminal to a calling party Service Control Point (SCP), and creating a bridged call session at the SCP connecting the called party terminals and the calling party VOIP terminal. The apparatus includes a system for sending called party terminal identifiers identifying each called party terminal to a calling party Service Control Point (SCP), and creating a bridged call session at the SCP connecting the called party terminals and the calling party VOIP terminal.

12 Claims, 2 Drawing Sheets

U.S. PATENT DOCUMENTS

| | | | |
|---|---|---|---|
| 2003/0081590 A1* | 5/2003 | Maroulis et al. | 370/352 |
| 2003/0169727 A1* | 9/2003 | Curry et al. | 370/352 |
| 2003/0185218 A1 | 10/2003 | Norris et al. | |
| 2003/0193933 A1* | 10/2003 | Jonas et al. | 370/352 |
| 2004/0013254 A1* | 1/2004 | Hamberg et al. | 379/202.01 |
| 2004/0028057 A1* | 2/2004 | Benjamin et al. | 370/395.52 |
| 2004/0170264 A1* | 9/2004 | Benco et al. | 379/202.01 |
| 2004/0170265 A1* | 9/2004 | Benco et al. | 379/202.01 |
| 2004/0228334 A1* | 11/2004 | Pan et al. | 370/352 |
| 2005/0018826 A1* | 1/2005 | Benco et al. | 379/202.01 |
| 2005/0066001 A1* | 3/2005 | Benco et al. | 709/204 |
| 2005/0122964 A1* | 6/2005 | Strathmeyer et al. | 370/352 |
| 2006/0058049 A1* | 3/2006 | McLaughlin et al. | 455/466 |

OTHER PUBLICATIONS

*Converged Networks and Services*, XP-002371228, 8 pages, 2000.
*The JAIN™ APIs: Integrated Network APIs for the Java™ Platform*, XP-002371219, pp. 1-27, Oct. 2002.
*An Architecture and Protocols for Initiation and Control of Telephone Calls from Terminals Connected to a CallBroker over a TCP/IP Connection*, Internet Engineering Task Force Internet Draft, pp. 1-12, Dec. 1997.
European Search Report.

\* cited by examiner

SYSTEM AND METHOD FOR CONFERENCE CALLING WITH VOIP TERMINAL

BACKGROUND OF THE INVENTION

This invention relates to a method and apparatus for Voice over Internet Protocol (VOIP) communications, and more particularly bridging multiple calls into a conference call session with a VOIP terminal.

Conference calls enable multiple parties to communicate with each other by joining the parties together in the same call session in a manner known as bridging. Typical Plain Old Telephone Service (POTS) terminals, also known as land line terminals, connect with one other party for each telephone line associated with the terminal. The POTS terminal can initiate a conference call with several called parties if the terminal has several telephone lines.

Otherwise, each party taking part in the conference call dials a Public Switched Telephone (PSTN) telephone number, also known as a Directory Number (DN), which connects the party to a switching element in the communications network. The party then enters a code, such as a participant code, and the switching element connects the party to the bridged call session thereby allowing them to take part in the conference call by communicating with all the other conference call participants.

Voice Over Internet Protocol (VOIP) calling uses Internet Protocol (IP) addressing schemes to provide packet switched voice communications over a packet data network such as the Internet. Rather than establishing a telephone line using a physical connection between the two terminals as is done with Plain Old Telephone Switched (POTS) circuit-switched calls VOIP uses an IP address for routing packet-based information to and from the VOIP terminal over the Internet to provide voice communications referred to as a call.

In order to communicate with terminals over the PSTN, a VOIP terminal IP address is associated with a DN and the conversion between the two is made in the communications network. Currently, as a result of established IP addressing schemes and VOIP protocols a party using a VOIP terminal to make a call effectively establishes only one "telephone line" connecting to one called party. It is desirable for a calling party to initiate a conference call using a VOIP terminal by simultaneously calling several called parties.

The present invention contemplates a new and improved system and method that resolves the above-referenced difficulties and others.

SUMMARY OF THE INVENTION

A system and method for connecting a plurality of called party terminals with a VOIP calling party terminal in a bridged call session are provided.

In one aspect of the invention the method includes the VOIP terminal sending called party terminal identifiers identifying each selected called party terminal to a calling party Service Control Point and the calling party SCP creating a bridged call session connecting the called party terminals and the calling party VOIP terminal.

In another aspect of the invention, the system includes means for selecting the called party terminals to be bridged, means for sending called party terminal identifiers identifying each selected called party terminal to a calling party Service Control Point, and means for creating a bridged call session connecting the called party terminals and the calling party VOIP terminal.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION OF THE PREFERRED EMBODIMENTS

Figure 1:
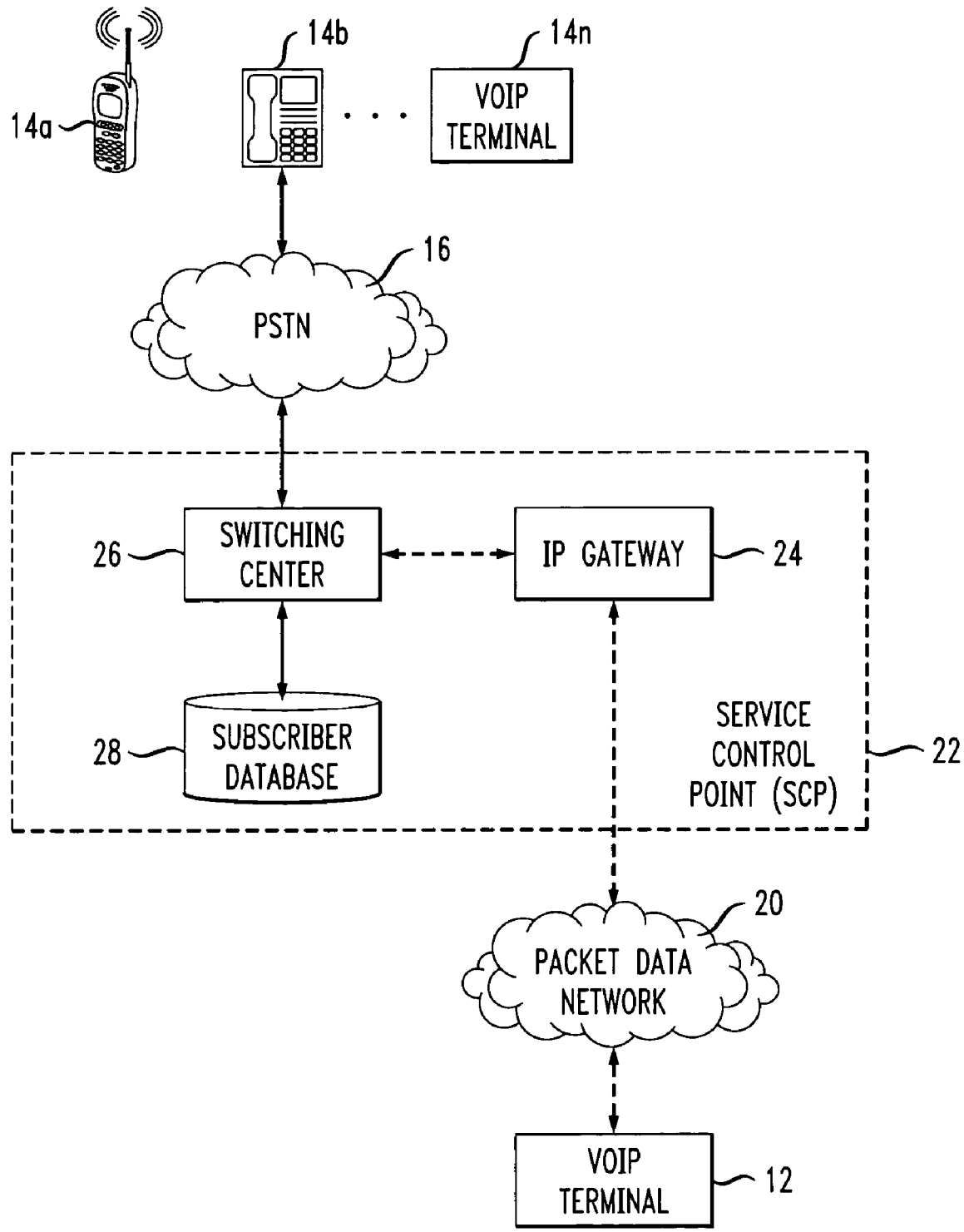
FIG. 1 is a block diagram illustrating a communications network including a system for practicing aspects of the present inventive subject matter.

Referring now to the drawings wherein the showings are for purposes of illustrating the preferred embodiments of the invention only and not for purposes of limiting same, FIG. 1 provides a view of the overall preferred system according to the present invention.

As shown in FIG. 1, a communications network is shown generally at 10 for providing communications between a VOIP calling party terminal 12 and a plurality of called party terminals 14a-14n referred collectively as called party terminals 14. Examples of the VOIP calling party terminal 12 can include, but are not limited to, a softphone running as an application on a computer, or a hardphone for providing voice communications using VOIP. Examples of the called party terminals 14 can include, but are not limited to, landlines also known as Plain Old Telephone Service telephones, mobile or cellular phones, VOIP terminals, or other phones capable of communicating over the Public Switched Telephone Network shown generally at 16. Each called party terminal 14 is connected to the PSTN in the usual applicable manner for providing communications to/from other terminals. Such connections may include conventional hardware and software processes which are not shown. Each called party terminal 14 has an identifier for routing calls to and from the terminal over the PSTN 16. An example of the called party terminal identifier, can include, but is not limited to a Directory Number (DN), such as a phone number from the North American Numbering Plan (NANP), among others.

The communications network 10 also includes a packet data network 20, such as for example the Internet, for providing the transmission of pack-based information using Internet Protocol (IP) addressing schemes. The VOIP terminal 12 is connected to the packet data network 20 for routing VOIP calls between the VOIP terminal 12 and the PSTN.

The communications network 10 also includes a Service Control Point 22 for handling calls to and from the calling party VOIP terminal 12 and the PSTN 16. Accordingly, the SCP 22 is referred to as the calling party SCP. The calling party SCP 22 includes an IP gateway 24, also known as a Media Gateway, for converting and/or translating IP based packet-switched calls into circuit switched calls and vice versa depending on the direction of traffic flow. That is to say, the IP gateway 24 operatively connects the packet data network 20 with the circuit switched Public Switched Telephone Network (PSTN) 16 for VOIP calls. By way of example, a suitable IP gateway 24 can include an iMerge®gateway provided by Lucent Technologies.

The calling party SCP 22 also includes a Switching Center 26 connected to the PSTN 16 for routing call traffic made by the VOIP terminal 12 to the PSTN and for routing call traffic from the PSTN destined for the VOIP terminal 12. The Switching Center 26 uses protocols, including but not limited to H.323 protocols among others, for routing these calls to and from the PSTN 16 using the DNs. The Switching Center 26 handles call set-ups for it's associated terminals, including the calling party VOIP terminal 12, as well as providing services for these terminals, including voice mail and others, which can be made available via subscription. The switching center 26 can be a Mobile Switching Center (MSC) for also connecting mobile phones with the PSTN 16.

The Switching Center 26 can be connected to a Subscriber Database 28 having subscriber information for the terminals associated with it. A subscriber identifier, such as a DN, can be used to identify the subscriber for associating the calling services ascribed to the subscriber. The subscriber database 28 and IP Gateway 24 can be located at the Switching Center 26 to form the SCP 22, or these elements can be connected in a known manner for quick and reliable communication therebetween.

Figure 2:
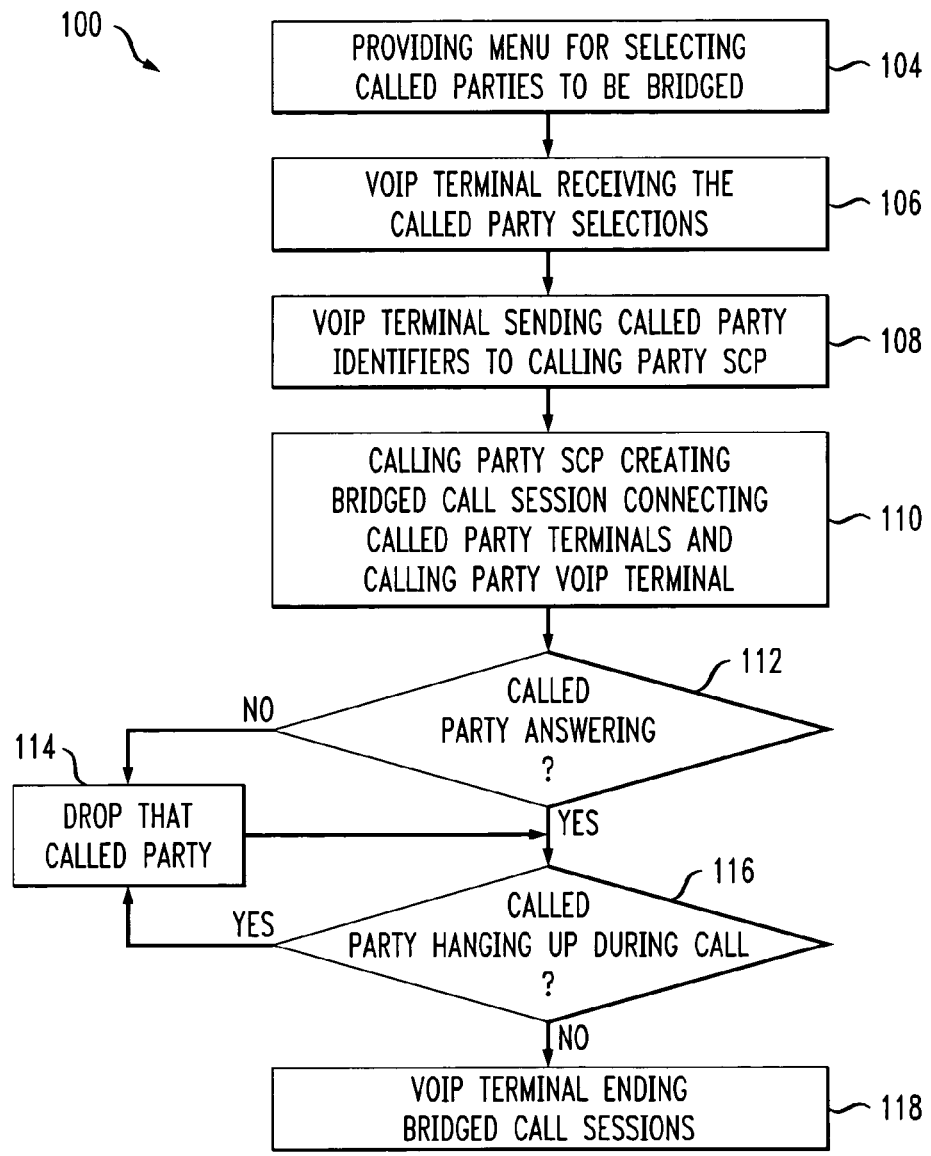
FIG. 2 is a flow chart illustrating a method in accordance with the present invention.

Referring now to FIG. 2, a method of operation of the VOIP conference call feature, is shown generally at 100, for a calling party initiating a conference call to a plurality of called parties 14. The calling party VOIP terminal 12 provides a menu at 104 for the calling party to select the called parties to be bridged together with the calling party in the conference call call session. The menu can provide a list of parties obtained from a software application such as an electronic address book, or they can be added by the calling party in any other suitable manner. The calling party selects the parties, referred to as the called parties, which are to be included in the conference call. The VOIP terminal 12 receives the called party selections made by the calling party at 106.

The calling party then instructs the VOIP terminal 12 to call the called parties. The calling party can do so in a single action, such as with a mouse click or by pressing a call button to simply and automatically initiate the conference call.

Figure 3:
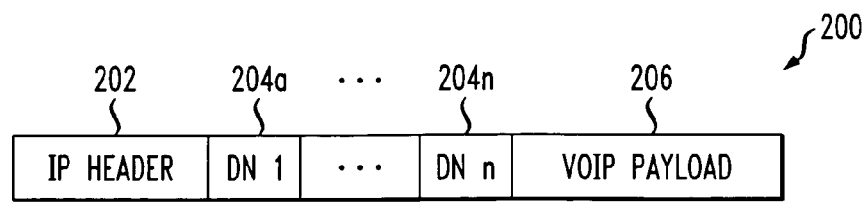
FIG. 3 illustrates a VOIP packet sent in accordance with the present invention.

Upon initiation of the call, the VOIP terminal software application engages in a call setup routine in which the VOIP terminal 12 sends called party identifiers to the calling party SCP 22 identifying each selected called party terminal. The called party terminal identifiers can be the PSTN directory numbers for each selected called party terminal used for routing calls and call information to/from the called party terminals over the PSTN 16. In one example, which should not be considered limiting, the VOIP terminal 12 combines the called party terminal identifiers into the VOIP packets 200 as shown in FIG. 3. Each VOIP packet 200 includes a VOIP header 202, the plurality of called party directory numbers 204a-204n, and a VOIP payload 206 having call information. The VOIP packets 200 can also include the IP address of the calling party VOIP gateway, the IP address of the IP gateway 24, and other information.

The SCP receives the VOIP packets sent by the VOIP terminal 12 over the packet data network 20 and creates a bridged call session connecting the called party terminals 14 with the calling party VOIP terminal 12 at 110. The IP gateway 24 can strip the called party directory numbers 204a-204n from the packets 200 and replicate the call information for each called party directory number. For each called party, the IP gateway can convert the VOIP call into a circuited call using the called party directory number. The Switching Center 26 can then create call sessions connecting the called party terminals 14 with the Switching Center over the PSTN 16, as shown in FIG. 1, using the called party directory numbers and bridge those call sessions together with the VOIP terminal 12 to create the bridged conference call enabling all the parties to communicate.

If a called party does not answer at 112, the Switching Center 26 can drop that called party terminal from the bridged call session at 114. Further, if a called party hangs up during the call at 116, the Switching Center 26 can drop that called party terminal from the bridged call session. The VOIP terminal can end the call bridged call session at 118 by hanging up thereby disconnecting the VOIP call to the calling party SCP 22.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method for connecting a plurality of called party terminals in a bridged call session with a Voice Over Internet Protocol (VOIP) calling party terminal comprising:

the VOIP terminal providing the calling party with means for selecting the called party terminals to be bridged;

the VOIP terminal receiving the called party terminal selections from the calling party;

the VOIP terminal combining called party terminal identifiers identifying the selected called party terminals into VOIP packets, wherein each of the VOIP Packets includes a VOIP header, the called party terminal identifiers and a VOIP call information payload;

the VOIP terminal sending the VOIP packets to a calling party Service Control Point (SCP) having an Internet Protocol (IP) Gateway and a Switching Center; and the calling party SCP creating a bridged call session connecting the called party terminals over the Public Switched Telephone Network (PSTN) and the calling party VOIP terminal.

2. The method defined in claim 1 wherein the called party identifiers are North American Numbering Plan (NANP) directory numbers.

3. The method defined in claim 2 wherein the creating step further comprises creating a bridged call session using the NANP directory numbers.

4. The method defined in claim 1 wherein the calling party SCP is a Switching Center.

5. The method defined in claim 1 wherein the creating step further comprises:

the calling party SCP stripping the called party terminal identifiers from the VOIP packets;

the calling party SCP replicating the call information contained in the VOIP packets for a plurality of call sessions, each call session destined for a different called party terminal;

the calling party SCP establishing a call session with each of the called party terminals; and the calling party SCP bridging the call sessions with each of the called party terminals with the VOIP terminal.

6. A system for bridging a plurality of called party terminals in a call session with a Voice Over Internet Protocol (VOIP) calling party terminal comprising:
- means for selecting the called party terminals to be bridged;
- means for sending in VOIP packets called party terminal identifiers identifying each selected called party terminal to a calling party Service Control Point (SCP) having an Internet Protocol (IP) Gateway and a Switching Center. wherein each of the VOIP packets includes a VOIP header, the called party terminal identifiers and a VOIP call information payload; and
- means for creating a bridged call session connecting the called party terminals over the Public Switched Telephone Network (PSTN) and the calling party VOIP terminal.

7. The system defined in claim 6 wherein the called party identifiers are North American Numbering Plan (NANP) directory numbers.

8. The system defined in claim 7 wherein the means for creating a bridged call session use the NANP directory numbers.

9. The system defined in claim 6 wherein the calling party SCP is a Switching Center.

10. The system defined in claim 6 wherein the means for creating a bridged call session includes an IP Gateway for stripping the called party terminal identifiers from the VOIP packets and replicating the call information contained in the VOIP packets for a plurality of call sessions, each call session destined for a different called party terminal, and a calling party Switching Center for establishing a call session with each of the called party terminals and bridging the call sessions with each of the called party terminals with the VOIP terminal.

11. A Voice Over Internet Protocol (VOIP) terminal comprising:
- means for selecting called party terminals to be bridged;
- means for combining called party terminal identifiers identifying the selected called party terminals into VOIP packets, wherein each of the VOIP packets includes a VOIP header, the called party terminal identifiers and a VOIP call information payload; and
- means for sending the VOIP packets to a calling party Service Control Point (SCP).

12. The VOIP terminal defined in claim 11 wherein the called party identifiers are North American Numbering Plan (NANP) directory numbers.

* * * * *